(12) United States Patent
Birkenheuer et al.

(10) Patent No.: US 12,049,571 B2
(45) Date of Patent: Jul. 30, 2024

(54) METHOD FOR TREATING METALLIC SURFACES WITH AN ACIDIC AQUEOUS COMPOSITION AND A POST RINSING COMPOSITION TO IMPROVE CORROSION RESISTANCE

(71) Applicant: SPECIALTY OPERATIONS FRANCE, Lyons (FR)

(72) Inventors: Stefan Birkenheuer, Shanghai (CN); Carina Hecker, Frankfurt am Main (DE); Oliver Sauer, Frankfurt am Main (DE); Daniel Schatz, Frankfurt am Main (DE); Nawel Souad Khelfallah, Frankfurt am Main (DE); Marie-Pierre Labeau, Sèvres (FR); Guillaume Gody, Rueil-Malmaison (FR)

(73) Assignee: SPECIALTY OPERATIONS FRANCE, Lyons (FR)

(*) Notice: Subject to any disclaimer, the term of this patent is extended or adjusted under 35 U.S.C. 154(b) by 672 days.

(21) Appl. No.: 17/257,200

(22) PCT Filed: Jul. 3, 2019

(86) PCT No.: PCT/EP2019/067874
§ 371 (c)(1),
(2) Date: Dec. 30, 2020

(87) PCT Pub. No.: WO2020/007926
PCT Pub. Date: Jan. 9, 2020

(65) Prior Publication Data
US 2021/0163757 A1 Jun. 3, 2021

(30) Foreign Application Priority Data
Jul. 5, 2018 (EP) .................................. 18182047

(51) Int. Cl.
| | | |
|---|---|---|
| *C09D 5/08* | (2006.01) |
| *C09D 5/00* | (2006.01) |
| *C09D 133/26* | (2006.01) |
| *C09D 183/08* | (2006.01) |
| *C23C 2/02* | (2006.01) |
| *C23C 2/26* | (2006.01) |
| *C23C 22/34* | (2006.01) |
| *C23C 22/78* | (2006.01) |
| *C25D 9/02* | (2006.01) |

(52) U.S. Cl.
CPC ............. *C09D 5/084* (2013.01); *C09D 5/002* (2013.01); *C09D 133/26* (2013.01); *C09D 183/08* (2013.01); *C23C 2/026* (2022.08); *C23C 2/26* (2013.01); *C23C 22/34* (2013.01); *C23C 22/78* (2013.01); *C23C 2222/20* (2013.01); *C25D 9/02* (2013.01)

(58) Field of Classification Search
None
See application file for complete search history.

(56) References Cited

U.S. PATENT DOCUMENTS

| | | |
|---|---|---|
| 2007/0240792 A1 | 10/2007 | Witteler et al. |
| 2012/0177826 A1 | 7/2012 | Kolberg et al. |

FOREIGN PATENT DOCUMENTS

| | | | |
|---|---|---|---|
| DE | 3940782 A1 | * | 6/1991 |
| DE | 102015225185 A1 | * | 6/2016 |
| EP | 2403978 A1 | | 1/2012 |
| FR | 2794464 A1 | | 12/2000 |
| JP | 2006213958 A | | 8/2006 |
| WO | 9630421 A1 | | 10/1996 |
| WO | 9801478 A1 | | 1/1998 |
| WO | 9858974 A1 | | 12/1998 |
| WO | 9931144 A1 | | 6/1999 |
| WO | 9935177 A1 | | 7/1999 |
| WO | 9935178 A1 | | 7/1999 |
| WO | 0075207 A1 | | 12/2000 |
| WO | 0142312 A1 | | 6/2001 |
| WO | 0226836 A2 | | 4/2002 |
| WO | WO 2006021309 A1 | * | 3/2006 |
| WO | 2016096777 A1 | | 6/2016 |
| WO | 2017220632 A1 | | 12/2017 |

OTHER PUBLICATIONS

International Search Report and Written Opinion for corresponding PCT/EP2019/067874 mailed Oct. 1, 2019, 11 pages.

* cited by examiner

*Primary Examiner* — Tae H Yoon

(57) ABSTRACT

Described herein is a method for treatment of a metallic surface, including the step of (A) contacting the metallic surface with a first aqueous composition, and a subsequent step of (B) contacting the metallic surface subsequent to step (A) with a second aqueous composition. Also described herein is a kit-of-parts including the first and second aqueous composition and a kit-of-parts including master-batches of the first and second aqueous compostions. Also described is a method of using the kit-of-parts for treating a metallic surface and substrates including the thus treated metallic surfaces.

16 Claims, No Drawings

METHOD FOR TREATING METALLIC SURFACES WITH AN ACIDIC AQUEOUS COMPOSITION AND A POST RINSING COMPOSITION TO IMPROVE CORROSION RESISTANCE

CROSS-REFERENCE TO RELATED APPLICATIONS

This application is a U.S. National Phase Application of International Patent Application No. PCT/EP2019/067874, filed Jul. 3, 2019, which claims the benefit of priority to European Patent Application No. 18182047.3, filed Jul. 5, 2018, the entire contents of which are hereby incorporated by reference herein.

The present invention relates to a method for treating metallic surfaces with an acidic aqueous composition and a post rinsing composition. The invention further relates to a kit-of-parts comprising an acidic aqueous composition and a post rinsing solution as used in the method for treatment, a kit-of-parts comprising a master batch to produce such acidic aqueous composition and a master batch to produce a post rinsing composition, the use of both compositions to treat metallic surfaces and substrates comprising the thus treated metallic surfaces.

The treatment of metallic surfaces with aqueous compositions, containing organoalkoxysilanes and their hydrolysis products and/or condensation products in the presence of further components is known. The coatings formed from these compositions provide a certain corrosion protection and adhesion to subsequent coating layers. It is also known, that some of these compositions contain polymers which are stable in an acidic environment and which can further improve some of the properties of the resultant layers.

However, particularly such metallic surfaces containing steel such as cold rolled steel or hot rolled steel, or which are hot dip galvanized steel or galvanized steel surfaces still suffer from corrosive sub-surface migration.

In particular, acidic prior art pretreatment compositions often show a destabilization of the polymer particles used therein. During treatment processes, the compositions are often filtered and such precipitated polymer particles are removed and/or clog the filters used for filtration. The depletion of the bath because of removed polymer precipitate makes it necessary to supplement such bath with much more polymer as would be necessary, if the polymer is dissolved in homogenous solution. Therefore, there is still a need to provide treatment procedures wherein the polymer does not tend to precipitate and stays in a solubilized form.

It was the aim of the present invention to overcome the drawbacks of prior art metallic surface pretreatment compositions, in particular to provide a method for treatment of a metallic surface where no or only negligible precipitation of the polymers occurs and the treated metallic surface shows an enhanced corrosion resistance even under severe test conditions as e.g. the accelerated corrosion test according to PV1210 (20 cycles) or the ACT I test. Particularly less sub-surface migration should be observed.

Some polymers used in prior art are well dissolved, but have a detrimental effect on stone chip resistance. Therefore a further problem to be solved by the present invention was to provide a method for treatment which has no or even slightly positive effects on the stone chip resistance.

The aims of the present invention were achieved by providing a method for treatment of a metallic surface, comprising step (A) of contacting the metallic surface with a first aqueous composition, the first aqueous composition being an acidic aqueous composition comprising
  (a) one or more metal compounds (M) selected from the group consisting of titanium compounds, zirconium compounds and hafnium compounds; and
  (b) one or more hydrolysable organosilane compounds (S) or their hydrolysis products (HS) and/or condensation products (CS);
and a subsequent step
(B) of contacting the metallic surface subsequent to step (A) with a second aqueous composition, the second aqueous composition comprising
  (c) one or more linear polymers (P), prepared by controlled radical polymerization, containing
    (m1) N,N-dimethyl (meth)acryl amide, and
    (m2) vinylphosphonic acid,
    in form of their polymerized monomeric units,
    with the proviso that 85 to 95 mol-% of the polymerized monomeric units are polymerized monomeric units of N,N-dimethyl (meth)acryl amide, and the rest of the polymerized monomeric units are polymerized monomeric units of vinylphosphonic acid, and
    the one or more linear polymers (P) are being comprised in the second aqueous composition in an amount of 10 to 500 ppm based on the total weight of the second aqueous composition.

The term "metallic" as used therein encompasses metals and alloys as e.g. zinc, steel etc.

The term "metallic surface" encompasses surfaces of metals and alloys as well as metallic or alloy surfaces deposited on non-metallic substrates. A metallic surface can also consist of different regions comprising different metals or alloys.

An "aqueous composition" is a composition containing at least 50 wt.-%, preferably at least 60 wt.-%, more preferably at least 70 wt.-% and most preferably at least 80 or even 90 wt.-% of water based on the total content of organic and inorganic solvents including water.

The term "acidic" means that the composition has pH value of less than 7 at room temperature (23° C.).

The term "(meth)acryl" is the generic term for both "acryl" and "methacryl". For example, the term "(meth)acrylic acid" stands for acrylic acid, methacrylic acid and the mixture of both.

The term "polymerized monomeric unit" means the unit generated by polymerization of the respective monomer. For example, the polymerized monomeric unit of vinylphosphonic acid ($H_2C=CH-P(=O)(OH)_2$) is $H_2C^*-C^*H-P(=O)(OH)_2$, wherein the asterisks denote the carbon atoms bound to the adjacent polymerized monomeric units.

A "hydrolysable organosilane compound" is an organosilicon compound having at least one Si—C bond and at least one hydrolysable group, such as a $Si-O(C=O)_nR^a$ group, wherein $R^a$ is an alkyl group preferably having 1 to 4 carbon atoms and n=0 or 1.

The "hydrolysis product" of the "hydrolysable organosilane compound" is an organo-silicon compound having at least one Si—C bond and at least one Si—OH group. The Si—OH group preferably being formed by hydrolysis of the above hydrolysable group, such as the $Si-O(C=O)_nR^a$ group under formation of the Si—OH group and $HO(C=O)_n R^a$, respectively.

The "condensation product" of the "hydrolysable organosilane compound" is an organo-silicon compound having at least one, preferably two or more Si—C bond(s)

and at least one Si—O—Si group. The Si—O—Si group preferably being formed by condensation reaction of a Si—O(C=O)$_n$R$^a$ group with a Si—OH group under formation of the Si—O—Si group and HO(C=O)$_n$R$^a$ or by condensation reaction of two Si—OH groups under formation of the Si—O—Si group and water.

The first aqueous compostion, i.e. the acidic aqueous composition as used in the above method for treatment may comprise further components and/or ions as lined out in the detailed description. The term "further comprises", as used herein throughout the description in view of the ingredients of the first aqueous compositions, means "in addition to the mandatory (a) metal compounds (M) and (b) hydrolysable silane compounds (S) and their hydrolysis products (HS) and condensation products (CS)". Therefore, such "further" compounds and/or ions differ from the mandatory ingredients.

The terms "first aqueous composition" and "second aqueous composition" as used herein are meant to indicate that the treatment with the first aqueous composition precedes the treatment with the second aqueous composition and that the use of both compositions is mandatory to the method for treatment according to the present invention. However, these terms are not meant to exclude one or more treatment steps between mandatory step (A) and mandatory step (B), or before or after steps (A) and (B). Therefore, it is for example possible to rinse the metallic surface after treatment step (A) with water, before carrying out treatment step (B). In a preferred embodiment of the invention treatment step (B) directly follows treatment step (A) without any intermediate steps. Furthermore, if there is the need to clean the metallic surface before carrying out the method for treatment according to the present invention, such cleaning step can also be carried out with an aqueous cleaning composition and/or followed by rinsing with water.

All "ppm specifications" as used herein are weight specifications. For example 10 ppm of polymer (P) in the second aqueous composition means 10 g of polymer (P) in 1,000 kg of the ready to use second aqueous composition. If not indicated otherwise the "ppm specifications" are based on the total weight of the first or second aqueous compositions.

The first aqueous composition as used in step (A) of the method according to the present invention does preferably not contain one or more of polymers (P).

DETAILED DESCRIPTION

Metallic Surface

Preferably the metallic surface contains or consists of one or more of the following metals or alloys: zinc, steel, cold rolled steel, hot rolled steel, galvanized steel (zinc plated steel) and hot-dip galvanized steel, and amongst these, particularly preferred are hot-dip galvanized steel (hot zinc dipped steel) and steel such as cold rolled steel. However, the method for treatment can also be carried with aluminum, magnesium and/or zinc-magnesium alloys as metallic surfaces. The metallic surface can also be a metallic surface of a composite material having two or more kinds of metallic surfaces. Such surfaces can be treated at the same time by any of the treatment methods as described herein below. Therefore, the method for treatment according to the present invention is also capable for multi-metal surface treatment.

The First Aqueous Composition (Acidic Aqueous Composition) as used in Step (A)

The first aqueous composition i.e. the acidic aqueous composition is preferably used as a dip coat bath. However it can also be applied to the metallic surfaces by virtually any conventional coating procedure like e.g. spray coating, roll coating, brushing, wiping etc.

The pH value of the acidic first aqueous composition is preferably in the range of 0.5 to 5.5, more preferred 2 to 5.5, particularly preferred 3.5 to 5.3 and most preferred 4 to 5. The pH is preferably adjusted by using nitric acid, aqueous ammonia and/or sodium carbonate.

Metal Compounds (M)

The metal compounds (M) selected from titanium, zirconium and hafnium compounds are preferably comprised in the first aqueous composition in an amount to achieve a metal concentration in the first aqueous composition of titanium, zirconium, hafnium or a mixture of these metals in the range from 20 to 1600 ppm, more preferably in the range from 40 to 700 ppm, even more preferably in the range from 60 to 250 ppm and most preferably in the range from 80 to 160 ppm, as e.g. 90 to 110 ppm based on Ti, Zr, Hf or their combinations.

Particularly preferred titanium, zirconium and hafnium compounds are the fluoro metallates of these metals. The term "fluoro metallate" includes the single and multiple protonated forms as well as the deprotonated forms. Particularly preferred is fluoro zirconate as a fluoro metallate. It is also possible to use mixtures of such fluoro metallates.

Moreover, zirconium can also be added in form of zirconyl compounds as e.g. zirconyl nitrate and zirconyl acetate; or zirconium carbonate or zirconium nitrate, the latter one being particularly preferred. The same applies to titanium and hafnium.

Hydrolysable Orqanosilane Compounds (S), their Hydrolysis Products (HS) and Condensation Products (CS)

The hydrolysable organosilane compound (S) is preferably selected from the group consisting of organoalkoxysilanes. Non-condensed and condensed hydrolysis products (HS) thereof are for example organosilanoles and polyorganosilanoles, while condensation products (CS) of the organosilane compound (S) can be subsumed under the generic classes of organosiloxanes and/or polyorganosiloxanes.

The hydrolysable organosilane compounds (S), their hydrolysis products (HS) and condensation products (CS) are contained in the first aqueous composition which is used in step (A) of the method for treatment according to the present invention in an amount of preferably 1 to 750 ppm, calculated as silicon (Si). More preferably the concentration is in the range of 5 to 500 ppm, even more preferably of 10 to 250 ppm and most preferably of 15 to 45 ppm, calculated as silicon.

Preferably, the hydrolysable silane compounds (S) comprise at least one, more preferably one or two of the following groups: amino groups, urea groups, imido groups, imino groups and/or ureidos group, particularly preferred are amino groups. The same applies for the hydrolysis products (HS) thereof. The condensation products (CS) of such hydrolysable silane compounds (S) will contain the same number of the before mentioned groups per condensed unit of the hydrolysable silane comprised in the condensation products (CS).

More preferably, said component b) in the first aqueous composition consists of one or more organoalkoxysilanes, organosilanoles, polyorganosilanoles, organosiloxanes and/or polyorganosiloxanes each having at least one, particularly one to two amino groups per condensed unit of the hydrolysable silane compound (S) comprised in the condensation products (CS). Particularly preferred hydrolysable silane compounds (S) are 2-aminoethyl-3-amino-propyltrimethoxysilane, 2-aminoethyl-3-amino-propyltriethoxysilane, bis (tri-methoxysilylpropyl)amine or bis(triethoxysilyl-propyl) amine or a combination of these.

Most preferred as hydrolysable silane compounds (S) are N-(2-aminoethyl)-3-aminopropyltrimethoxysilane and bis [3-(trimethyoxysilyl)propyl]amine and their combinations. The hydrolysis products (HS) and condensation products (CS) thereof can be formed in situ in the first aqueous composition or in advance in an aqueous medium, which may subsequently being added to become part of the first aqueous composition.

Further Components and/or Ions that may be Contained in the First Aqueous Composition Metal Cations Preferably the first aqueous composition further comprises at least one kind of metal cation selected from the group of cations of metals of the $1^{st}$ to $3^{rd}$ subgroup (copper, zinc and scandium groups) and $5^{th}$ to $8^{th}$ subgroup (vanadium, chromium, manganese, iron, cobalt and nickel groups) of the periodic table of the elements including the lanthanides as well as the $2^{nd}$ main group of the periodic table of the elements (alkaline earth metal group), lithium, bismuth and tin. The before-mentioned metal cations are generally introduced in form of their water-soluble compounds, preferably as their water-soluble salts.

More preferably the further metal cation(s) is/are selected from the group consisting of cations of cerium and the other lanthanides, chromium, iron, calcium, cobalt, copper, magnesium, manganese, molybdenum, nickel, niobium, tantalum, yttrium, vanadium, lithium, bismuth, zinc and tin.

Most preferred as further metal cations are zinc, copper, cerium and/or molybdenum cations. Amongst these, zinc cations and copper cations, particularly copper cations, are given preference.

Generally the total concentration of the further metal cations under this headline in the first aqueous composition is in the range of 5 to 5000 ppm. The most preferred range for zinc cations in the first aqueous composition is 100 to 5000 ppm, for each of copper and cerium cations 5 to 50 ppm and for molybdenum 10 to 100 ppm.

pH-Value Adjusting Substances

Preferably the first aqueous composition used in step (A) of the method for treatment of a metallic surface according to the invention includes one or more substances selected from the group consisting of nitric acid, sulfuric acid, methanesulfonic acid, acetic acid, aqueous ammonia, sodium hydroxide and sodium carbonate, wherein nitric acid, aqueous ammonia and sodium carbonate are preferred. Depending on the pH value of the first aqueous composition, the above compounds can be in their fully or partially deprotonated form or in protonated forms.

Organic Solvents

While the addition of solvents is neither necessary nor specially desired, the first aqueous composition used in step (A) of the method for treatment of a metallic surface according to the invention, may contain some organic solvents, particularly ethanol and/or methanol. By using the preferred organoalkoxysilanes, as described above, as hydrolysable organosilane compound (S), ethanol and methanol, respectively, are formed in situ due to hydrolysis and/or condensation of the hydrolysable organosilane compound (S) in the acidic aqueous environment.

Water-Soluble Fluorine Compounds

The first aqueous composition used in step (A) of the method for treatment of a metallic surface according to the invention, preferably further contains water-soluble fluorine compounds such as fluorides and hydrofluoric acid.

The amount of free fluoride ($F^-$) in the first aqueous composition used in step (A) of the method for treatment of a metallic surface according to the invention is preferably in the range of 15 to 150 ppm, more preferably 25 to 100 ppm and most preferred 30 to 50 ppm.

Further Ions

The first aqueous composition used in step (A) of the method for treatment of a metallic surface according to the invention, can contain further ions, as for example sodium and/or ammonium ions, phosphates and/or phosphonates, and nitrates, each of them from sources other than the afore-mentioned sources. For example, nitrates may origin from the afore-mentioned nitric acid used for pH adjustment, but also from salts of nitric acid. However, sulfur containing compounds, particularly sulfates should be avoided. Therefore, it is preferred that the amount of sulfur containing compounds in the acidic aqueous composition is below 100 ppm (calculated as sulfur).

If ppm amounts or ranges are mentioned above or below with respect to any ions or any ingredients, it is irrespective from which source the ions origin.

The Second Aqueous Composition as used in Step (B)

The second aqueous composition is preferably used as a rinsing compositions, such as a post-rinsing solution or a dip coat bath. However it can also be applied to the metallic surfaces by virtually any conventional coating procedure like e.g. spray coating, roll coating, brushing, wiping etc.

The pH value of the polymer (P) containing second aqueous composition used in step (B) of the method for treatment of a metallic surface according to the invention, is preferably in the range of 3.0 to 6.5, more preferred 3.5 to 6.0, particularly preferred 4.0 to 5.5 and most preferred 4.5 to 5.0. The pH is preferably adjusted by using nitric acid, aqueous ammonia and/or sodium carbonate.

Polymer (P)

Polymer (P) comprises polymerized monomeric units formed from (m1) N,N-dimethyl (meth)acryl amide and (m2) vinylphosphonic acid, with the proviso that 85 to 95 mol-% of all monomeric units are polymerized units of N,N-dimethyl (meth)acryl amide and the rest of the polymerized monomeric units are polymerized units of vinylphosphonic acid.

In a preferred embodiment polymer (P) consists of polymerized monomeric units formed from (m1) N,N-dimethyl (meth)acryl amide and (m2) vinylphosphonic acid, with the proviso that preferably 87 to 93 mol-% of all monomeric units are polymerized units of N,N-dimethyl (meth)acryl amide.

Polymer (P) preferably has a number average molecular weight Mn from 10,000 to 30,000 g/mol and a weight average molecular weight Mw from 20,000 to 60,000 g/mol.

Polymer (P) is contained in the second aqueous composition, which is used in step (B) of the method of treatment according to the present invention, in a concentration of 10 to 500 ppm based on the weight of the second aqueous composition. Preferably the concentration is in the range of 20 to 250 ppm, more preferably in the range of 25 to 150 ppm and most preferably in the range of 30 to 100 ppm or even more preferred in the range of 40 to 60 ppm based on the weight of the second aqueous composition.

Polymers (P) are linear polymers. The monomeric units can be arranged statistically, in two or more blocks or as a gradient along the polymeric backbone of polymer (P). However, such arrangements can also be combined. A statistical, i.e. random arrangement of monomeric units along the polymeric backbone of polymer (P) is preferred.

The polymers (P) are specifically prepared by a controlled radical polymerization of monomers (m1) and (m2), said polymerization being carried out continuously or batchwise. According to a specific embodiment the one or more polymers (P) used in the method of treatment according to the present invention are random copolymers obtained by a controlled radical copolymerization of monomers (m1) and (m2), namely copolymers obtained by contacting monomers (m1) and (m2), a free radical source and a radical polymerization control agent.

Herein, the term "radical polymerization control agent" (or more concisely "control agent") refers to a compound which is capable of extending the lifetime of the growing polymer chains in a radical polymerization reaction and of conferring, on the polymerization, a living or controlled nature. This control agent is typically a reversible transfer agent as used in controlled radical polymerization denoted by the terminology RAFT or MADIX, which typically use a reversible addition-fragmentation transfer process, such as those described, for example, in WO 96/30421, WO 98/01478, WO 99/35178, WO 98/58974, WO 00/75207, WO 01/42312, WO 99/35177, WO 99/31144, FR 2794464 or WO 02/26836.

According to an advantageous embodiment, the radical polymerization control agent used for preparing polymer (P) is a compound which comprises a thiocarbonylthio group —S(C=S)—. Thus, for example, it may be a compound which comprises at least one xanthate group (bearing —SC=S—O— functions), for example one or two xanthates. According to one embodiment, the compound comprises several xanthates. Other types of control agent may be envisaged (for example of the type used in ATRP (Atom Transfer Radical Polymerization)).

Typically, the control agent is a non-polymeric compound bearing a group that ensures control of the radical polymerization, especially a thiocarbonylthio group —S(C=S)—. According to a more specific variant, the radical polymerization control agent is a polymer, advantageously an oligomer and bearing a thiocarbonylthio —S(C=S)— group, for example a xanthate —SC=S—O— group, typically obtained by a radical polymerization monomers in the presence of a control agent bearing a thiocarbonylthio —S(C=S)— group, for example a xanthate.

A suitable control agent may, for example, have formula (A) below:

(A)

wherein:

Z represents hydrogen, chlorine, a cyano group, a dialkyl- or diarylphosphonato radical, dialkyl-phosphinato or diarylphosphinato radical or any of the following optionally substituted radicals: an alkyl radical, an aryl radical, a heterocyclic radical, an alkyl thio radical, an aryl thio radical, an alkoxy radical, an aryloxy radical, an amino radical, a hydrazine radical, an alkoxycarbonyl radical, an aryloxycarbonyl radical, an acyloxy or carboxyl radical, an aroyloxy radical, a carbamoyl radical, polymeric chain radical; and $R_1$ represents any of the following optionally substituted radicals: an alkyl radical, an acyl radical, an aryl radical, an aralkyl radical, an alkenyl radical or alkynyl radical; or a saturated or unsaturated or aromatic, optionally substituted carbocycle or heterocycle; or a polymer chain radical, which is preferably hydrophilic or water-dispersible.

The groups $R_1$ or Z, when they are substituted, may be substituted with optionally substituted phenyl groups, optionally substituted aromatic groups, saturated or unsaturated carbocycles, saturated or unsaturated heterocycles, or groups chosen from the following: alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl $C_nF_{2n+1}$, allyl, epoxy, alkoxy (—OR), S-alkyl, S-aryl, groups of hydrophilic or ionic nature, such as alkali metal salts of carboxylic acids, alkali metal salts of sulfonic acids, polyalkylene oxide (PEO, PPO) chains, cationic substituents (quaternary ammonium salts), R representing an alkyl or aryl group, or a polymer chain.

The group $R_1$ may alternatively be amphiphilic, i.e. it may have both hydrophilic and lipophilic nature. It is preferable for $R_1$ not to be hydrophobic.

$R_1$ may typically be a substituted or unsubstituted, preferably substituted, alkyl group. A control agent of formula (A) may nevertheless comprise other types of groups $R_1$, in particular a ring or a polymer chain radical.

The optionally substituted alkyl, acyl, aryl, aralkyl or alkyne groups generally bear from 1 to 20 carbon atoms, preferably from 1 to 12 and more preferentially from 1 to 9 carbon atoms. They may be linear or branched. They may also be substituted with oxygen atoms, in particular in the form of esters, sulfur atoms or nitrogen atoms.

Among the alkyl radicals, mention may be made especially of the methyl, ethyl, propyl, butyl, pentyl, isopropyl, tert-butyl, pentyl, hexyl, octyl, decyl or dodecyl radical. The alkyne groups are radicals preferably comprising 2 to 10 carbon atoms; they bear at least one acetylenic unsaturation, such as the acetylenyl radical.

The acyl group is a radical preferably bearing from 1 to 20 carbon atoms with a carbonyl group.

Among the aryl radicals, mention may be made especially of the phenyl radical, which is optionally substituted, in particular with a nitro or hydroxyl function.

Among the aralkyl radicals, mention may be made especially of the benzyl or phenethyl radical, which is optionally substituted, in particular with a nitro or hydroxyl function.

When $R_1$ or Z is a polymer chain radical, this polymer chain may result from a radical or ionic polymerization or from a polycondensation.

Advantageously, the control agent is selected from compounds bearing a xanthate —S(C=S)O—, trithiocarbonate, dithiocarbamate or dithiocarbazate function, for example compounds bearing an O-ethyl xanthate function of formula —S(C=S)OCH$_2$CH$_3$. Xanthates prove to be very particularly advantageous, in particular those bearing an O-ethyl xanthate —S(C=S)OCH$_2$CH$_3$ function, such as O-ethyl S-(1-(methoxycarbonyl)ethyl) xanthate (CH$_3$CH(CO$_2$CH$_3$))S(C=S)OEt.

Unlike other state of the art polymers, the polymers (P) used in the method of the present invention do not only reduce the corrosive sub-surface migration, they also do not tend to precipitate in the second aqueous compositions as used in step (B) of the method for treatment of a metallic surface according to the present invention.

Without wanting to be bound by theory it is believed that the metal compounds (M) are apt to etch the metallic surfaces in the acidic environment of the first aqueous composition, resulting in the formation of a pH gradient with increasing pH value near the metallic surface. However, it was surprising that this pH gradient formed in step (A) of the method for treatment according to the invention still seems to exist when the metallic surface is contacted with polymer (P) in step (B) partially causing a deprotonation of phosphonic acid groups present in monomeric unit (m2) of polymer (P). This in turn causing the attachment of the partially deprotonated phosphonic acid groups to the metallic surface under formation of a barrier layer which prevents and/or reduces the migration or diffusion of corrosive salts to the metallic surface.

The properties of the formed coatings are thus being improved, particularly the corrosive sub-surface migration, particularly on steel and hot-dip galvanized steel surfaces and substrates, is significantly reduced.

The linear polymer (P) consists of 85 to 95 mol-% of polymerized monomeric units, formed from (m1), i.e. N,N-dimethyl (meth)acryl amide and 5 to 15 mol-% of polymerized monomeric units, formed from (m2), i.e. vinylphosphonic acid, based on the total amount of polymerized monomeric units.

A particularly preferred polymer (P) is obtained by a controlled radical polymerization of a monomer mixture consisting of 87 to 93 mol-% of N,N-dimethyl (meth)acryl amide and 7 to 17 mol-% of vinylphosphonic acid, most preferably a monomer mixture consisting of 90 mol-% of N,N-dimethyl (meth)acryl amide and 10 mol-% of vinylphosphonic acid; the particularly preferred polymer (P) having a number average molecular weight Mn from 12,000 to 20,000 g/mol, more preferred from 13,000 to 16,000 g/mol; and a weight average molecular weight from 22,000 to 30,000 g/mol, more preferred from 24,000 to 28,000 g/mol. Most preferably polymer (P) is obtained by a controlled radical polymerization of a monomer mixture consisting of 90 mol-% of N,N-dimethyl (meth)acryl amide and 10 mol-% of vinylphosphonic acid and having a number average molecular weight Mn being 14,400 g/mol and the weight average molecular weight Mw being 26,000 g/mol.

Such a polymer may for example be prepared by a controlled radical polymerization using O-ethyl S-(1-(methoxycarbonyl)ethyl) xanthate as a control agent (see above), according to the process described for example in WO 98/58974.

The number average and weight average molecular weights, Mn and Mw, respectively, as referred to in the instant description, may be measured according to the following protocol:

Samples are analyzed by SEC equipped with a MALS detector. Absolute molar masses are obtained with a dn/dC value chosen equal to 0.1875 mL/g in order to get a recovery mass around 90%. Polymer samples are dissolved in the mobile phase and the resulting solutions are filtrated with a Millipore filter 0.45 μm. Eluting conditions are the following ones. Mobile phase: $H_2O$ 100% vol. 0.1 M NaCl, 25 mM $NaH_2PO_4$, 25 mM $Na_2HPO_4$; 100 ppm $NaN_3$; flow rate: 1 mL/min; columns: Varian Aquagel OH mixed H, 8 μm, 3*30 cm; detection: RI (concentration detector Agilent)+MALLS (MultiAngle Laser Light Scattering) Mini Dawn Tristar+UV at 290 nm; samples concentration: around 0.5 wt % in the mobile phase; injection loop: 100 μL.

Treatment Procedure

The metallic surfaces to be treated may be cleaned and/or edged before treatment with the first aqueous composition in step (A) of the method for treatment according to the present invention. The treatment procedure can for example be a spray coating or dip coating procedure. The first aqueous composition can also be applied by flooding the metallic surface or by roll coating or even manually by wiping or brushing. Furthermore it is possible to use an electrodeposition method for the treatment of the metallic surface.

The treatment time, i.e. the period of time the metallic surface is contacted with the first aqueous composition used in step (A) of the method for treatment of a metallic surface according to the invention, is preferably from 15 seconds to 20 minutes, more preferably from 30 seconds to 10 minutes, and most preferably 45 seconds to 5 minutes, as for example 1 to 3 minutes. If the metallic surface is the surface of a coil and the treatment procedure is a coil-coating procedure, the treatment time can be even lower than 15 seconds, for examples as low as 1, 2 or 3 seconds while the upper limit or treatment time in this procedure may also be 15 minutes or 20 minutes.

The temperature of the first aqueous composition used in step (A) of the method for treatment of a metallic surface according to the invention is preferably from 5 to 50° C., more preferably from 15 to 40° C. and most preferably from 25 to 35° C.

In step (B) of the method for treatment according to the present invention the metallic surface is brought in contact with the second aqueous composition containing polymer (P). Most preferable step (B) is a post-rinsing step and/or the second aqueous composition is used as a rinsing composition or rinsing solution.

The post-rinsing step (B) is preferably carried out for 15 seconds to 5 minutes, more preferred 20 seconds to 3 minutes and most preferred 30 to 90 seconds.

The temperature of the second aqueous composition containing polymer (P) used in step (B) of the method for treatment of a metallic surface according to the invention is preferably from 5 to 50° C., more preferably from 10 to 40° C. and most preferably from 20 to 30° C.

Further Subjects of the Invention

A further subject of the invention is a kit-of-parts comprising i. the first aqueous composition, which is described above for the use in step (A) of the method for treatment of a metallic surface according to the invention and ii. the second aqueous composition, which is described above for the use in step (B) of the method for treatment of a metallic surface according to the invention.

Yet another subject of the present invention is a kit-of-parts comprising i. a master batch to produce the first aqueous composition as described above and ii. a master batch to produce the second aqueous composition as described above.

If the two master batches are used to produce the first and second aqueous compositions as used in the method for treatment according to the present invention, the master batches typically contain the respective ingredients of the of the first and second aqueous compositions, respectively, in the desired proportions, but at a higher concentration. Such master batches are preferably diluted with water to the concentrations of ingredients as disclosed above to form the first and second aqueous compositions. If necessary, the pH value of the aqueous compositions may be adjusted after dilution of the master batches.

Of course it is also possible to further add ingredients to the water wherein the master batches are diluted or to add ingredients after diluting the master batches with water. It is however preferred that the master batches already contains all necessary ingredients.

Preferably the master batches are each diluted with water and/or an aqueous solution in the ratio of 1:5,000 to 1:10, more preferred 1:1,000 to 1:10, most preferred in the ratio of 1:300 to 1:10 and even more preferred 1:150 to 1:50, before use.

Another subject of the present invention is the use of a kit-of-parts comprising the first and second aqueous compositions for treating a metallic surface. Particularly preferred is the use of the kit-of-parts, comprising the first and second aqueous compositions for treating a metallic surface to provide corrosion protection to the metallic surface and/or to provide an excellent adhesion of further coatings applied onto the thus treated metallic surface. The metals and/or alloys of the metallic surfaces are the same as described above.

Yet another subject of the invention is a substrate comprising a metallic surface, treated according to the method for treatment of the present invention. Such substrates can for example be used as parts of motor vehicles such as automobiles, rail vehicles, aircrafts, spacecrafts, parts of apparatus and machines, furniture parts, parts used in the construction field, to produce guard railing, lamps, profiles, cover panels or small parts, autobodies and parts thereof, single or separate components, pre-assembled elements, preferably for automobiles and aircrafts, for the manufacture of apparatus and constructions, particularly for household aids, control units, testing equipment or construction elements. Most preferred substrates comprising a metallic surface, treated according to the method for treatment of the present invention are autobodies, parts of autobodies, single components and pre-assembled elements for automobiles.

The metallic surfaces treated according to the invention can be coated by further, i.e. subsequent coatings. Before the application of further coatings the treated metallic surface is preferably rinsed to remove excessive polymer (P), and if still present excessive hydrolysable organosilane compound (S) and hydrolysis products (HS) and/or condensation products (CS) thereof, as well as unwanted ions.

The subsequent coatings can be applied wet-on-wet onto the metallic surface as treated in the method for treatment according to the invention. However it is also possible to dry the metallic surface as treated according to the invention before applying any further coating.

Most preferably the metallic surface as treated in the method for treatment according to the present invention is subsequently coated with a cathodic electrodeposition coating composition. Preferably the cathodic electrodeposition coating composition comprises epoxy resins and/or poly(meth)acrylates and if applicable crosslinking agents such as blocked polyisocyanates and/or aminoplast resins.

Most preferably the cathodic electrodeposition coating is subsequently coated after drying and/or curing with one or more filler compositions, one or more basecoat compositions and one or more clear coat compositions in this order. Filler compositions, basecoat compositions and clear coat compositions can be applied wet-in-wet. The thus obtained multilayer coating is preferably cured thermally or thermally and with actinic radiation, such as UV light or electron beams.

In the following the invention is further described by means of working examples.

EXAMPLES i) Substrates and Pretreatment
Substrates

As substrates metal sheets (10.5×19 cm) made of cold rolled steel and hot dip galvanized steel, respectively, were used.

Cleaning

The substrates were cleaned with a mild alkaline dip cleaner (Gardoclean® S 5176; Chemetall GmbH) containing phosphate, borate and tenside. To clean the substrates a 50-Liter bath containing the cleaner in an amount of the 15 g/l is heated to 60° C. and the substrates were spray-cleaned for 3 minutes at a pH of 10.0 to 11.0. Subsequently the substrates were rinsed with tap water and deionized water.
Preparation of the Conversion Bath (First Aqueous Composition)

Oxsilan® Additive 9936 (Chemetall GmbH; containing fluoride and hexafluorozirconic acid) and Oxsilan AL 0510 (Chemetall GmbH; containing N-(2-aminoethyl)-3-aminopropyltrimethoxysilane and bis[3-(trimethyoxysilyl)propyl]amine) were added to 50 liter of water, in an amount that a zirconium concentration of 100 ppm (as Zr) and a silane concentration of 30 ppm (as Si) resulted. The thus obtained bath was heated to 30° C. The pH value and free fluoride content were adjusted by adding a diluted sodium hydrogencarbonate solution and diluted hydrofluoric acid (5% by weight) to a pH value of 4.8 and a free fluoride concentration of 30 to 40 mg/l.

Furthermore, copper sulfate was added in an amount to result in a copper concentration of 15 ppm.

The bathes as described above did not contain the polymer used in the method of the invention and are first aqueous compositions in the meaning of the present invention.

Before contacting the metal sheets with the respective conversion bathes, the conversion bathes were aged for 12 hours, to ensure a chemical equilibrium within the bathes.

The pH value was continuously adapted during and between the treatment process according to step (A) by the addition of diluted nitric acid.

Step (A) according to the method for treatment of the present invention was carried out by dipping the metal sheets into the conversion bath for 120 seconds, while moderately stirring the bath. Subsequently, the thus pretreated metal sheets were rinsed with
  i. tap water and deionized water (reference); or
  ii. with the second aqueous composition (as described below), followed by tap water and deionized water (examples according to the present invention).
Preparation of the Second Aqueous Composition To obtain the second aqueous compositions, which can be used according to the method for treatment of the present invention, 200 ppm of the inventively used polymer (IP), which is a copolymer prepared from 90 mol-% of N,N-dimethyl (meth)acryl amide and 10 mol-% of vinylphosphonic acid, having a number-average molecular weight Mn of 14,400 g/mol and a weight-average molecular weight Mw of 26,000 g/mol, was added to water.
ii) Analysis, Subsequent Coating and Corrosion Tests
  X-Ray Fluorescence Analysis The layer weights of zirconium as shown in table 2 were determined by X-ray fluorescence analysis.

X-ray fluorescence is an analytical technique that can be used to determine the elemental composition of solid substances. A beam of x-rays strikes the surface of the sample and a core electron is ejected from the atom that absorbed the x-ray photon. When an outer electron falls into the hole created by the ejected electron, it emits energy in form of light. This light is called fluorescence and a characteristic pattern exists for each element.

The spectrometer permits qualitative and quantitative determination of any number of elements from Na to U, from trace levels 0.01% to 100%.

Analysis of the Bathes

The composition of the first and second aqueous compositions with respect to the metal compound (M), the silicon containing species (S), (HS) and (CS) and the further metal cations can be determined during the treatment with inductively coupled plasma optical emission spectrometry (ICP-OES) or approximately by photometry, to top-up the amounts into the desired ranges, if necessary.

Subsequent Coatings

The pretreated substrates were coated by cathodic electrodeposition dip coating using Cathoguard® 800 (BASF SE). Subsequently a filler, basecoat and clear coat were applied (Daimler Black). The layer thickness of the coating layer was determined according to DIN EN ISO 2808:2007. The layer thickness was in the range of about 90 to 110 μm.

Corrosion Testing Procedures

Two different types of corrosion stress procedures were carried out, namely
 a) the VW PV 1210 procedure; and
 b) the ACT I test.

As to a):

The VW PV 1210 procedure is to determine the corrosion protection of vehicle paint using an accelerated laboratory test. It is claimed that testing according to this procedure can generate results that correlate well with those seen by driven vehicles. This test is cyclic in nature, i.e. test specimens are exposed to changing climates over time.

For the VW PV 1210 procedure the test specimens were placed in an enclosed chamber and exposed to a changing climate that was comprised of the following repeating cycle. 4.0 hours exposure to salt spray at 35° C. according to DIN EN ISO 9227 NSS. This was followed by 4.0 hours exposure to an ambient climate of +18 to +28° C. according to DIN EN ISO 6270-2 AHT. This was followed by 16.0 hours exposure to a condensing water climate at 40° C. according to DIN EN ISO 6270-2 CH. The before-mentioned three conditions were repeated 4 times. This was followed by 2×24 hours exposure to an ambient climate of +21 to +25° C. (relative humidity 50%±5%) according to DIN 50014 23/50. Twenty cycle repeats were carried out.

As to b):

The ACT I test is the shortcut of an Accelerated Corrosion Test determined by Volvo and corresponding standard STD 423-0014. This standard specifies a test procedure to be used in conducting the accelerated corrosion test to simulate atmospheric corrosion conditions in a controlled way. This test procedure serves as a general purpose atmospheric corrosion test and can be applied to a wide variety of materials, coatings and interactions of materials. It has been developed to allow the evaluation of the corrosion resistance of metals in environments where there is a significant influence of chloride ions, mainly as sodium chloride from a marine source or by winter road de-icing salt. This test is cyclic in nature, i.e. test specimens are exposed to changing climates over time.

The one-week main test cycle is composed of two twelve-hour sub-cycles; one with controlled humidity cycling (sub-cycle 1), the other including salt application (sub cycle 2). Should it be necessary to open the chamber, this shall be done during the 24-hour period immediately before the wet phase.

The main cycle is principally based on a repetition of sub-cycle 1, which is defined as follows:

Step 1:1 constant conditions at 35° C. and 95% relative humidity for 4 hours

Step 1:2 a temperature increase from 35° C. to 45° C. with a simultaneous linear reduction of the relative humidity from 95% relative humidity to 50% relative humidity over a period of 2 hours Step 1:3 constant conditions at 45° C. and 50% relative humidity for 4 hours Step 1:4 a temperature decrease from 45° C. to 35° C. with a simultaneous increase of the relative humidity from 50% relative humidity to 95% relative humidity over a period of 2 hours On Mondays and Fridays, sub-cycle 1 is replaced once by sub-cycle 2, which is defined as follows:

Step 2:1 spraying with salt solution for 15 minutes

Step 2:2 constant conditions at 35° C. for 105 minutes with a relative humidity set point at 95 to 99% relative humidity in such a way that the test object remains wet Steps 2:1 and 2:2 are repeated twice in sequence to give a total period of 6 hours Step 2:3 drying the test objects at a relative humidity set point of 50% relative humidity and with a temperature increase from 35° C. to 45° C. over a period of 2 hours; the specified humidity level shall be reached within two hours leaving the test objects and chamber and interior without visible wetness Step 2:4 constant conditions at 45° C. and 50% relative humidity for 2 hours Step 2:5 a temperature decrease from 45° C. to 35° C. with a simultaneous increase of relative humidity from 50% relative humidity to 95% relative humidity over a period of 2 hours The ACT I test was run for 6 weeks.

After both procedures, a) and b), the sub-surface migration testing according to DIN EN ISO 4628-8:2012 was carried out and the sub-surface migration was determined in mm. Furthermore, a stone chip resistance test according to DIN EN ISO 20567-1:2017, method C, was carried out after the VW PV 1210 (20 cycles) procedure.

iii) Results and Discussion

Table 1 shows the results of the sub-surface migration test after carrying out the cyclic corrosion test according to VW PV 1210 (20 cycles) using a hot dip galvanized steel substrate. The reference example and the inventive example were both treated according to step (A) of the method for treatment according to the present invention, with the bath as described above. In step (B) the reference example was only rinsed with tap water and deionized water before further coating as described above, while the rinsing step (B) for the inventive example was carried out with water containing 200 ppm of polymer (P) before rinsing with tap water and deionized water and carrying out the subsequent coating.

The stone chip resistance test according to DIN EN ISO 20567-1:2017, method C, reveals that there is even a slightly increased stone chip resistance, if polymer (P) is used. The lover the value, the better.

TABLE 1

| VW PV 1210 (20 cycles) - Hot Dip Galvanized Steel Substrate | | |
|---|---|---|
| Polymer | Sub-surface migration [mm] | Stone Chip Resistance Test |
| no polymer | 2.7 | 4.2 |
| IP | 1.4 | 3.7 |

Table 2 shows the results of the sub-surface migration test (horizontally and diagonally) after carrying out the ACT I test using a cold rolled steel substrate.

While the zirconium layer weight is almost the same for the reference example (55 mg/m$^2$) and the example according to the invention (57 mg/m$^2$), the sub-surface migration, horizontally and diagonally, was significantly reduced for the inventive example indicating an enhanced corrosion resistance.

TABLE 2

| | ACT I - Cold Rolled Steel Substrate | | |
|---|---|---|---|
| Polymer | Zr layer weight [mg/m$^2$] | Sub-surface migration (horizontally) [mm] | Sub-surface migration (diagonally) [mm] |
| no polymer | 55 | 7.9 | 8 |
| IP | 57 | 5.7 | 5.2 |

The invention claimed is:

1. A method for treatment of a metallic surface, comprising the step
   (A) of contacting the metallic surface with a first aqueous composition, the first aqueous composition being an acidic aqueous composition comprising
      (a) one or more metal compounds (M) selected from the group consisting of titanium compounds, zirconium compounds and hafnium compounds; and
      (b) one or more hydrolysable organosilane compounds (S) or their hydrolysis products (HS) and/or condensation products (CS);
   and a subsequent step
   (B) of contacting the metallic surface subsequent to step (A) with a second aqueous composition, the second aqueous composition comprising
      (c) one or more linear polymers (P), prepared by controlled radical polymerization, containing
         (m1) N,N-dimethyl (meth)acryl amide, and
         (m2) vinylphosphonic acid,
      in form of their polymerized monomeric units, with the proviso that 85 to 95 mol-% of the polymerized monomeric units are polymerized monomeric units of the N,N-dimethyl (meth)acryl amide, and the rest of the polymerized monomeric units are polymerized monomeric units of the vinylphosphonic acid, and
   the one or more linear polymers (P) are being comprised in the second aqueous composition in an amount of 10 to 500 ppm based on the total weight of the second aqueous composition.

2. The method according to claim 1, characterized in that the metallic surface contains or consists of one or more metals or alloys selected from the group consisting of zinc, steel, cold rolled steel, hot rolled steel, galvanized steel, hot-dip galvanized steel, aluminum, magnesium and zinc-magnesium alloys.

3. The method according to claim 1, characterized in that the first aqueous composition has a pH in the range of 0.5 to 5.5.

4. The method according to claim 1, characterized in that the one or more metal compounds (M) are the fluoro metallates of said metals and/or the one or more metal compounds (M) are comprised in the first aqueous composition in the range of 20 to 1600 ppm.

5. The method according to claim 1, characterized in that the one or more linear polymers (P) are comprised in the second aqueous composition in a concentration in the range of 20 to 250 ppm.

6. The method according to claim 1, characterized in that the one or more hydrolysable organosilane compounds (S) or their hydrolysis products (HS) and/or condensation products (CS) are selected from the group consisting of organoalkoxysilanes, organosilanoles, polyorganosilanoles, organosiloxanes and polyorganosiloxanes and/or that the one or more hydrolysable organosilane compounds (S) or their hydrolysis products (HS) and/or condensation products (CS) are comprised in the first aqueous composition in a concentration in the range of 1 to 750 ppm.

7. The method according to claim 6, characterized in that the hydrolysable organosilane compounds (S) or their hydrolysis products (HS) comprise at least one of the groups selected from the group consisting of amino groups, urea groups, imido groups, imino groups and ureidos group, and the one or more condensation products (CS) of the hydrolysable silane compounds (S) comprises the same number of the before mentioned groups per condensed unit of the hydrolysable silane compound (S) or its hydrolysis product (HS).

8. The method according to claim 1, characterized in that the first aqueous composition further comprises (d) at least one kind of metal cation selected from the group consisting of metal cations of metals comprised in the $1^{st}$, $2^{nd}$, $3^{rd}$, $5^{th}$, $6^{th}$, $7^{th}$ or $8^{th}$ subgroup of the periodic table of the elements including lanthanides, the metal cations of metal comprised in the 2nd main group of the periodic table of the elements, lithium, bismuth and tin.

9. The method according to claim 8, characterized in that the (d) at least one kind of metal cation is selected from the group consisting of the cations of zinc, copper, cerium and molybdenum and/or the (d) at least one kind of metal cation is comprised in the first aqueous composition in a concentration in the range of 5 to 5000 ppm.

10. The method according to claim 1, characterized in that the first aqueous composition further comprises e) a water-soluble fluorine compound.

11. The method according to claim 10, characterized in that the water-soluble fluorine compound is a water-soluble fluoride having free fluoride ions (F) and a concentration of free fluoride in the first aqueous composition is in the range of 15 to 150 ppm.

12. A kit-of-parts, comprising
   i. a first aqueous composition, the first aqueous composition being an acidic aqueous composition comprising
      one or more metal compounds (M) selected from the group consisting of titanium compounds, zirconium compounds and hafnium compounds; and
      one or more hydrolysable organosilane compounds (S) or their hydrolysis products (HS) and/or condensation products (CS); and
   ii. a second aqueous composition, the second aqueous composition comprising
      (c) one or more linear polymers (P), prepared by controlled radical polymerization, containing
         (m1) N,N-dimethyl (meth)acryl amide, and
         (m2) vinylphosphonic acid,
      in form of their polymerized monomeric units, with the proviso that 85 to 95 mol-% of the polymerized monomeric units are polymerized monomeric units of the N,N-dimethyl (meth)acryl amide, and the rest of the polymerized monomeric units are polymerized monomeric units of the vinylphosphonic acid, and the one or more linear polymers (P) are being comprised in the second aqueous composition in an amount of 10 to 500 ppm based on the total weight of the second aqueous composition.

13. A kit-of-parts, comprising
i. a first master batch to produce a first aqueous composition by diluting the first master batch with water and if applicable adjusting the pH value, the first aqueous composition being an acidic aqueous composition comprising
   one or more metal compounds (M) selected from the group consisting of titanium compounds, zirconium compounds and hafnium compounds; and
   one or more hydrolysable organosilane compounds (S) or their hydrolysis products (HS) and/or condensation products (CS); and
ii. a second master batch to produce a second aqueous composition by diluting the second master batch with water and if applicable adjusting the pH value, the second aqueous composition being an aqueous composition comprising
   (c) one or more linear polymers (P), prepared by controlled radical polymerization, containing
      (m1) N,N-dimethyl (meth)acryl amide, and
      (m2) vinylphosphonic acid,
in form of their polymerized monomeric units,
with the proviso that 85 to 95 mol-% of the polymerized monomeric units are polymerized monomeric units of the N,N-dimethyl (meth)acryl amide, and the rest of the polymerized monomeric units are polymerized monomeric units of the vinylphosphonic acid, and
the one or more linear polymers (P) are being comprised in the second aqueous composition in an amount of 10 to 500 ppm based on the total weight of the second aqueous composition.

14. The method according to claim 1, characterized in that the method provides corrosion protection to the metallic surface and/or provides an increased adhesion of further coatings applied onto the thus treated metallic surface.

15. A substrate comprising a metallic surface, treated according to the method as defined in claim 1, the substrate being selected from the group consisting of parts of motor vehicles, rail vehicles, aircrafts, spacecrafts, parts of apparatus and machines, furniture parts, parts used in the construction field, to produce guard railing, lamps, profiles, cover panels or small parts, autobodies and parts thereof, single or separate components, pre-assembled elements, for the manufacture of apparatus and constructions, for household aids, control units, testing equipment and construction elements.

16. The kit-of-parts according to claim 13, wherein the first master batch and/or the second master batch are diluted with water and/or an aqueous solution in a ratio of 1:5,000 to 1:10.

* * * * *